United States Patent
Denkin et al.

(10) Patent No.: US 6,356,386 B1
(45) Date of Patent: Mar. 12, 2002

(54) METHOD AND APPARATUS FOR STABILIZING TRANSIENT CONTROL IN AMPLIFIED OPTICAL NETWORKS

(75) Inventors: Nathan Myron Denkin, Aberdeen, NJ (US); Matthias Richard Feulner, Nuremberg (DE); Jiong Ma, Tinton Falls, NJ (US); Dieter Werner, Neunkirchen am Brand (DE); Mingjuan Zhu, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/515,906

(22) Filed: Feb. 29, 2000

(51) Int. Cl.[7] .................................................. H01S 3/00
(52) U.S. Cl. ..................... 359/337; 359/341.4; 359/124
(58) Field of Search .............................. 359/341.4, 124, 359/177, 337

(56) References Cited

U.S. PATENT DOCUMENTS

| | | |
|---|---|---|
| 5,680,246 A | 10/1997 | Takahashi et al. |
| 5,933,262 A | 8/1999 | Sasagawa |
| 6,163,399 A | * 12/2000 | Berg ........................... 359/341 |
| 6,166,850 A | * 12/2000 | Roberts et al. .............. 359/341 |

FOREIGN PATENT DOCUMENTS

| | | | |
|---|---|---|---|
| EP | 0 732 786 A | 9/1996 | ............. H01S/3/25 |
| EP | 0 963 065 A | 12/1999 | ........... H04B/10/17 |

OTHER PUBLICATIONS

Richards, D. H. et al., "A Theoretical Investigation of Dynamic All–Optical Automatic Gain Control in Multichannel EDFA's and EDFA Cascades", *IEEE J. of Selected Topics in Quantum Elecronics*, vol. 3, No. 4, Aug. 1997, pp. 1027–1036.

Sun, Y. et al, "Fast power transients in WDM optical networks with cascaded EDFAs", *Electronics Leters*, vol. 33, No. 4, Feb. 13, 1997, pp. 313–314.

Srivastava, A. K. et al., "Fast–Link Control Protection of Surviving Channels in Multiwavelength Optical Networks", *IEEE Photonics Technology Letters*, vol. 9, No. 12, Dec. 1997, pp. 1667–1669.

Suzuki, H., "Dynamic Gain Control by Maximum Signal Power Channel in Optical Linear Repeaters for WDM Photonic Transport Networks", *IEEE Photonics Technology Letters*, vol. 10, No. 5, May 1998, pp. 734–736.

Richards, D. H. et al., "Multichannel EDFA Chain Control: A Comparison of Two All–Optical Approaches", *IEEE Photonics Technology Letters*, vol. 10, No. 1, Jan. 1998, pp. 156–158.

* cited by examiner

*Primary Examiner*—Mark Hellner
(74) *Attorney, Agent, or Firm*—Gregory J. Murgia

(57) ABSTRACT

An apparatus and method are described for controlling response to power transients in an optically amplified wavelength division multiplexed (WDM) network when WDM optical channels are added and dropped, during network reconfigurations, during failure events, and so on. In one embodiment, a variable bandwidth filter circuit operates at a first prescribed bandwidth during a first time period $\tau_0$ to detect a change in signal power (i.e., power transient) caused by a transient event, and operates at a second prescribed bandwidth that is less than the first prescribed bandwidth after the first period of time elapses, e.g., $\tau_0 + \Delta\tau$, to substantially suppress low level signal variations, such as remnants of the power transient. In this way, the power transient related to the actual transient event will be preserved to trigger control circuitry, e.g., amplifier gain control based on input power changes, while the remnants will be filtered out to prevent unwanted responses by the control circuitry, e.g., remnants misinterpreted as actual transient events.

29 Claims, 6 Drawing Sheets

600

METHOD AND APPARATUS FOR STABILIZING TRANSIENT CONTROL IN AMPLIFIED OPTICAL NETWORKS

CROSS-REFERENCE TO RELATED APPLICATION

This application is related to co-pending and commonly assigned U.S. patent application Ser. No. 09/382,853, which is incorporated by reference herein.

TECHNICAL FIELD

The invention relates generally to optically amplified lightwave communication systems and, more particularly, to controlling transient response in such systems.

BACKGROUND OF THE INVENTION

To meet the increasing demands for more bandwidth and higher data rates in today's networks, wavelength division multiplexing (WDM) is being used extensively in long haul optical transmission systems and is being contemplated for use in short haul applications, such as metropolitan area networks and the like. As is well known, WDM combines many optical channels each at a different wavelength for simultaneous transmission as a composite optical signal in a single optical fiber.

Optical amplifiers are commonly used in lightwave communication systems as in-line amplifiers for boosting signal levels to compensate for losses in a transmission path, as power amplifiers for increasing transmitter power, and as pre-amplifiers for boosting signal levels before receivers. In WDM systems, optical amplifiers are particularly useful because of their ability to amplify many optical channels simultaneously. Rare earth-doped fiber optical amplifiers, e.g., erbium-doped fiber amplifiers, are commonly used in WDM systems, although other types of optical amplifiers, e.g., semiconductor optical amplifiers, can also be used.

In an optically amplified WDM system, signal power transients in a WDM signal can be a significant problem. Signal power transients may occur as a result of adding or dropping individual optical channels, network reconfigurations, failures or recovery from failures, and so on. For example, adding or dropping individual channels of a WDM signal may cause changes in input power to an optical amplifier, which in turn results in changes in gain as well as fluctuations of power levels in surviving optical channels, i.e., those optical channels that are still present in the WDM signal after an add/drop has occurred. Stated otherwise, because optical amplifiers in WDM systems are typically operated in saturation, the output power of an optical amplifier will not necessarily change in a corresponding manner with input power changes and, as a result, optical power in the individual surviving channels will fluctuate undesirably. These power fluctuations may result in unnecessary protection switches in the network, transmission stabilization problems, unacceptable bit error rate degradation if power variations are not within the dynamic range of receiver equipment, and other power-related problems.

Several gain control schemes have been proposed for reducing the effects of power transients. For example, U.S. patent application Ser. No. 09/382853, entitled "Fast Gain Control for Optical Amplifiers", which is incorporated by reference herein, describes one approach for reducing the effects of signal power transients in an optically amplified WDM network. In this approach, per-channel gain of individual optical channels is kept relatively constant despite changes in input power at the optical amplifier, such as when individual optical channels of the WDM signal are added/dropped. By maintaining relatively constant per-channel gain in an amplified WDM signal despite changes in input power at the optical amplifier, power fluctuations are substantially reduced in surviving optical channels of the WDM signal.

However, even when a gain control scheme is employed, there still may be problems relating to power transients that may perpetuate in the network depending on network topology and other factors. For example, gain-controlled optical amplifiers may compensate for large power transients, but typically will not achieve complete suppression of low level signal variations. In particular, so-called remnants of the power transients may still perpetuate around the network. As used herein, power transient is meant to correspond to the initial power-affecting change where it is desirable to respond to the transient event, e.g., the aforementioned gain control to respond to a change in channel count. Remnants of power transients, or artifacts as they are sometimes referred to, are typically a result of imperfect approximations that are made when responding to the initial transient event, e.g., approximations of the amount of required gain adjustment. Remnants may be in the form of oscillations of the initial power transient that perpetuate as an error signal around the network. Unless attenuated, these remnants may de-stabilize or otherwise disturb the network. For example, remnants that are continuously routed around a network may trigger unwanted effects if, for example, a subsequent optical amplifier cannot distinguish the remnants from the initial power transient caused by an actual transient event.

Remnants can be especially problematic in particular network topologies, such as a ring network. A WDM ring network, as is well-known, typically includes a plurality of interconnected nodes, at which WDM optical signals may be amplified and at which individual optical channels may be added or dropped. In a WDM ring network, remnants may continue to circulate around the ring getting further amplified as they pass through subsequent nodes. Consequently, the probability of remnants triggering an undesirable response increases in a network topology such as a ring. Moreover, during amplification, well-known cross-saturation effects (e.g., gain at a wavelength is affected by power present at other wavelengths) may imprint the relatively low frequency components of amplitude variations of a signal at one wavelength on signals at other wavelengths. Similarly, during high power operation, non-linear effects in the fiber also may transfer such amplitude variations from one wavelength to another. Thus, even if a channel with remnants is dropped at a node, the effects of the original power transient may still persist in channels that continue to propagate in the ring.

SUMMARY OF THE INVENTION

In optically amplified wavelength division multiplexed (WDM) networks, response to power transients is controlled according to the principles of the invention in such a way that control circuitry responds only to power transients caused by an actual transient event and not, to remnants of those power transients that propagate around the network. More specifically, a variable bandwidth filter circuit according to the principles of the invention operates at a first prescribed bandwidth during a first time period $\tau_0$ to detect a change in signal power (i.e., power transient) caused by a transient event, and operates at a second prescribed bandwidth that is less than the first prescribed bandwidth after the first period of time elapses, e.g., $\tau_0+\Delta\tau$, to filter out low level signal variations, such as remnants of the power transient, noise, and so on. In this way, the power transient related to the actual transient event is preserved to trigger control circuitry, e.g., amplifier gain control based on input power changes, while remnants are filtered out to prevent unwanted responses, e.g., remnants misinterpreted as actual transient events.

According to one illustrative embodiment, the variable bandwidth filter circuit includes a band splitter for splitting an input signal into its low and high frequency signal components. The low frequency signal components are routed in a first transmission path having a low frequency amplifier while the high frequency signal components are routed in a second transmission path having a high frequency amplifier. A switch is employed in the second path to either pass or block the transmission of the high frequency components of the input signal depending on whether a power transient is detected by a transient detector. A band adder combines the signal components from the first and second paths to form an output signal that can then be used for subsequent transient control processing, e.g., optical amplifier gain control. By passing both high and low frequency components of the input signal when a transient event is detected, the bandwidth is effectively "opened" to capture both the high and low frequency signal components of the power transient in the input signal. By passing only the low frequency components of the input signal when a power transient is not detected, the bandwidth is effectively "closed" or reduced so that only slow variations in the input signal are passed along.

BRIEF DESCRIPTION OF THE DRAWING

A more complete understanding of the invention may be obtained from consideration of the following detailed description of the invention in conjunction with the drawing, with like elements referenced with like reference numerals, in which.

DETAILED DESCRIPTION OF THE INVENTION

Although the illustrative embodiments described herein are particularly well-suited for a wavelength division multiplexed (WDM) ring network having a plurality of nodes capable of amplifying and adding/dropping WDM optical channels, and shall be described in this exemplary context, those skilled in the art will understand from the teachings herein that the principles of the invention may also be employed in conjunction with other types of optical communication systems and networks. For example, the principles of the invention may be employed in network topologies which may include cross-connects or other switching arrangements that are used to connect ring networks, star networks, point-to-point networks, mesh networks, and so on. Accordingly, the embodiments shown and described herein are only meant to be illustrative and not limiting.

Figure 1:
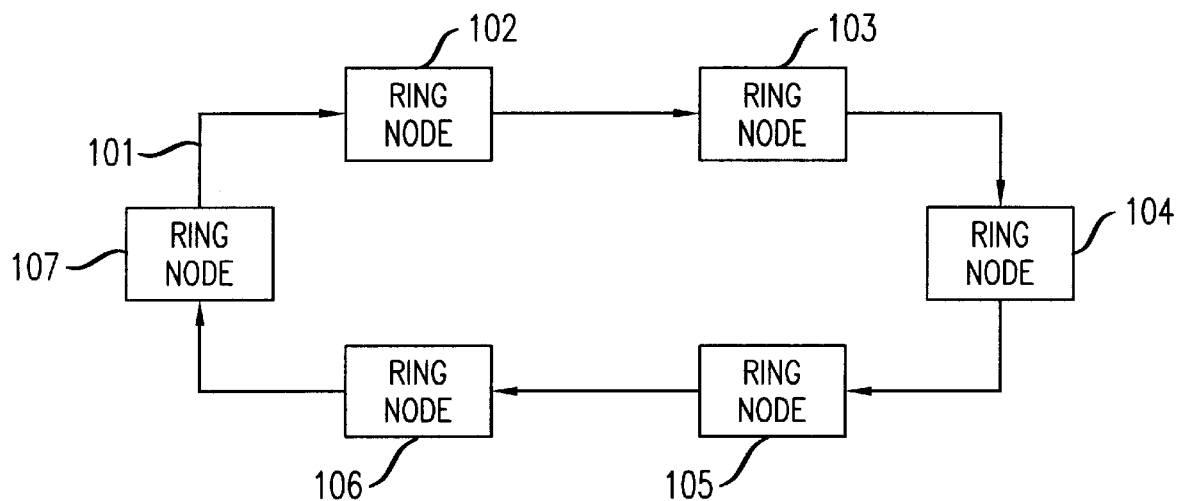
FIG. 1 is a simplified block diagram showing an optical ring transmission system in which the principles of the invention may be practiced.

FIG. 1 shows a typical ring network 100 comprising a plurality of ring nodes 102–107 interconnected by optical fiber 101. Ring network 100 may support single wavelength optical communications or multi-wavelength optical communications employing WDM techniques. For simplicity of explanation, the embodiments of the invention will be described in the context of WDM transmission. As such, optical fiber 101 of ring network 100 carries a composite WDM optical signal comprising a plurality of individual optical channels of different wavelengths.

As is well-known, ring nodes 102–107 may be configured to perform one or more different functions such as, for example, adding and dropping optical signals, amplification ,of optical signals that are added, dropped, or otherwise passing through the ring node, and so on. Consequently, each of ring nodes 102–107 may not necessarily be equivalent in function or structure. For the purpose of describing the principles of the invention, at least one of ring nodes 102–107 is capable of adding and/or dropping individual optical channels from the WDM optical signal as well as amplifying the WDM optical signal.

Figure 2:
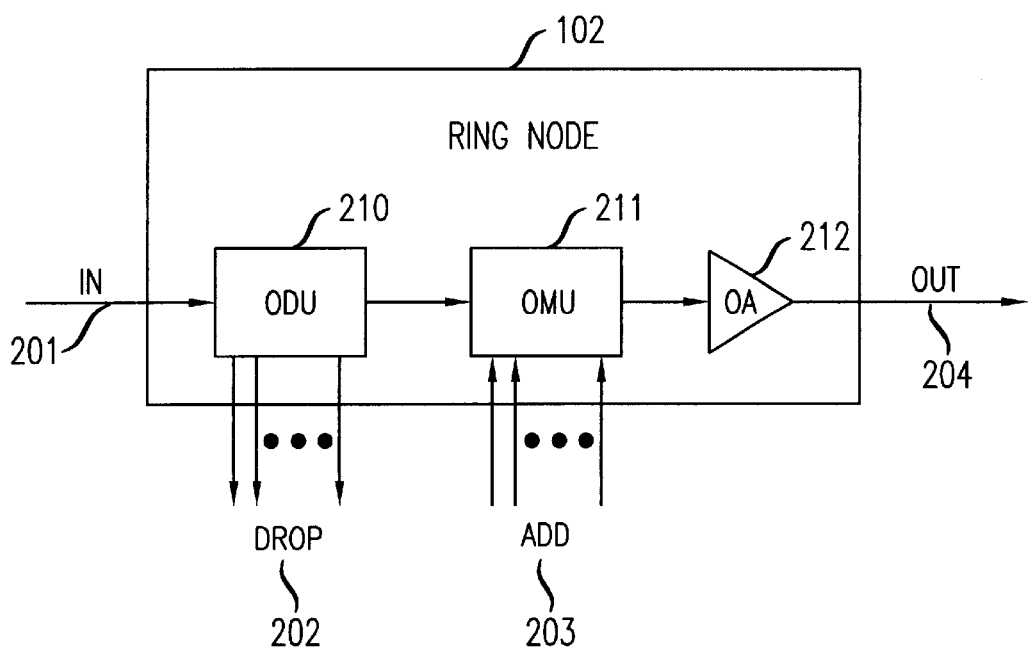
FIG. 2 is a simplified block diagram of an exemplary ring node from the optical ring transmission system of FIG. 1.

For example, FIG. 2 shows a simplified functional block diagram of ring node 102 from network 100. Briefly, ring node 102 receives an input WDM signal 201, drops one or more selected optical channels 202 via optical demultiplexer unit 210, adds one or more selected optical channels 203 via optical multiplexer unit 211, amplifies the further propagating optical channels in the WDM signal via optical amplifier 212, and transmits an output WDM signal 204 for the next ring node in network 100. It will be apparent to those skilled in the art that the number of dropped and added channels do not necessarily have to be equal. Output WDM signal 204 therefore includes all optical channels from input WDM signal 201 less the dropped optical channels 202 plus the added optical channels 203.

Various well-known devices can be used for optical demultiplexer unit 210 and optical multiplexer unit 211 such as, for example, waveguide grating routers, thin film filters, fiber Bragg gratings in conjunction with optical circulators or directional couplers, and so on. As such, the detailed structure and operation of optical demultiplexer unit 210 and optical multiplexer unit 211 will not be described in detail herein. Similarly, those skilled in the art will recognize various amplification schemes suitable for use in ring node 102. By way of example, rare earth-doped fiber optical amplifiers, such as erbium-doped fiber amplifiers, are used extensively in existing WDM systems.

The problem solved by the invention relates to power transients that occur in the WDM optical signal transported around the ring network. More specifically, the principles of the invention are directed toward handling remnants of power transients or other low level signal variations, e.g., noise, that remain in the WDM signal after a transient control scheme, such as a gain control scheme, has already processed the signal to account for the initial power transients. As previously described, signal power transients may occur during transient events, such as when one or more individual optical channels are added or dropped, during network reconfigurations, in response to failures or recovery from failures, and so on.

For a better understanding of the principles of the invention, a brief summary will first be provided on how power transients may be initially handled in a WDM system by a gain control scheme. In particular, it is well-known that optical amplifiers, such as erbium-doped fiber amplifiers, are typically operated in saturation in WDM systems. As such, the output power of an optical amplifier will not correspondingly change according to input power changes (e.g., power transients) and, as a result, optical power in the individual surviving channels will fluctuate undesirably. For example, when 4 out of 8 channels in a WDM signal are dropped, the power in each surviving channel then increases toward double its original channel power in order to conserve the saturated amplifier output power. Many different gain control schemes have been proposed for controlling the response of optical amplifiers to such signal power transients.

Referring back to FIG. 2, a gain control scheme may be employed to control the response of optical amplifier 212 in the presence of power transients that may arise as a result of optical channels being dropped and/or added by optical demultiplexer unit 210 and optical multiplexer unit 211, respectively. The input power to optical amplifier 212 may change in response to a change in channel load (e.g., number of optical channels in the input WDM signal 201) as a result of add/drop functions in ring node 102. One approach for reducing the effects of signal power transients in an optically amplified WDM network is described in commonly assigned U.S. patent application Ser. No. 09/382853, entitled "Fast Gain Control for Optical Amplifiers", which is incorporated by reference herein in its entirety. Briefly, in this approach, gain of an optical amplifier is controlled in a feed-forward based control scheme by controlling the amount of pump power supplied to the optical amplifier as a function of changes in optical input power to the optical amplifier which are measured in a feed-forward monitoring path. The amount of pump power for effecting gain control is then adjusted according to a scaled relationship to the measured input power of the optical amplifier. By maintaining relatively constant per-channel gain in an amplified WDM signal despite changes in input power at the optical amplifier (i.e., power transients), power fluctuations in surviving optical channels of the WDM signal are substantially reduced. Other suitable schemes for controlling the response of optical amplifiers to transient events will be apparent to those skilled in the art and are also contemplated for use in conjunction with the principles of the invention.

As previously described, even when a gain control scheme is employed, there still may problems relating to power transients that may perpetuate in the network depending on network topology or other factors. For example, remnants of a power transient from an actual transient event may persist in the network when gain control circuitry does not completely suppress the transient. Remnants are especially problematic in ring networks, such as ring network 100 (FIG. 1), because the remnants might be amplified as they circulate around the ring. As such, the potential for an improper or undesirable response to these remnants becomes even greater. For example, a remnant of a previous power transient may trigger a gain control response. This response is undesirable because a gain correction was already effected in response to the power transient associated with the actual event, e.g., change in input power based on added/dropped channels. The problem could become worse if the remnants continue to propagate around the ring network. Consequently, remnants circulating in a ring network can quickly de-stabilize transmission performance in a ring.

Figure 3:
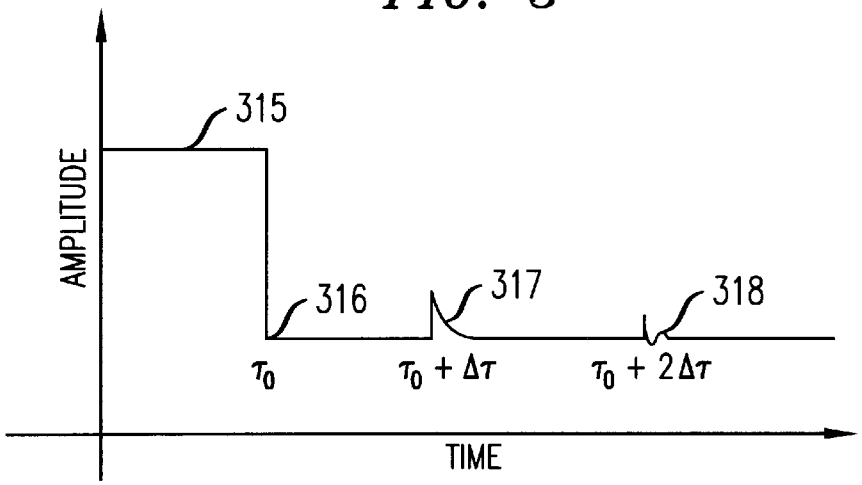
FIG. 3 is an exemplary plot of amplitude versus time illustrating the presence of power transients and associated remnants for an optical signal propagating around the optical ring transmission system shown in FIG. 1.

FIG. 3 shows an exemplary plot of a signal processed by a typical control arrangement, such as one used to control an optical amplifier's response to power transients caused by certain events or conditions, e.g., adding/dropping channels. More specifically, a power transient at time $\tau_0$ is shown to occur when a signal drops from a first power level 315 to a second power level 316 in response to the particular transient event or condition at time $\tau_0$. This power transient therefore corresponds to the initial event which triggers an action by the control arrangement. However, despite the corrections implemented by the control arrangement in response to power transient 316 at time $\tau_0$, remnants 317 and 318 are produced. In particular, remnants 317 and 318 of the original power transient 316 appear at times separated by $\Delta\tau$ as they travel around the ring network, shown here as $\tau_0+\Delta\tau$, $\tau_0+2\Delta\tau$, and so on. For a WDM ring network, $\Delta\tau$ would represent the round trip time for the remnant to travel around the ring. By way of example, $\Delta\tau$ may be on the order of approximately 400 $\mu$sec for a typical WDM ring configuration having several nodes and a fiber length of approximately 80 kilometers. It should also be noted that the particular form of remnants 317 and 318 may vary considerably. For example, remnants 317 and 318 may be in the form of oscillations of the original power transient 316 and their form and amplitude will depend on many factors including, but not limited to: number of nodes between wavelength add/drop; degree of amplifier saturation; accuracy of the transient control scheme (e.g., gain control scheme); system channel load; relative power changes; and so on.

Consequently, the invention is directed to the problem of handling the remnants 317–318 that remain after the transient control arrangement, e.g., gain control scheme, responds to the initial power transient 316. Stated otherwise, the invention ensures that the remnants from any imperfect response to the initial power transients do not circulate around the ring network in such a way that they will trigger undesirable responses downstream, e.g. cause unnecessary protection switches, improper gain control response (i.e., false trigger for gain control), and so on. In sum, it is desirable to limit response to only the original transient event, e.g., change in channel count, and not to the remnants that circulate around the ring thereafter. To that end, one embodiment of the invention substantially suppresses or otherwise reduces these remnants from an insufficient gain control response.

Figure 4:
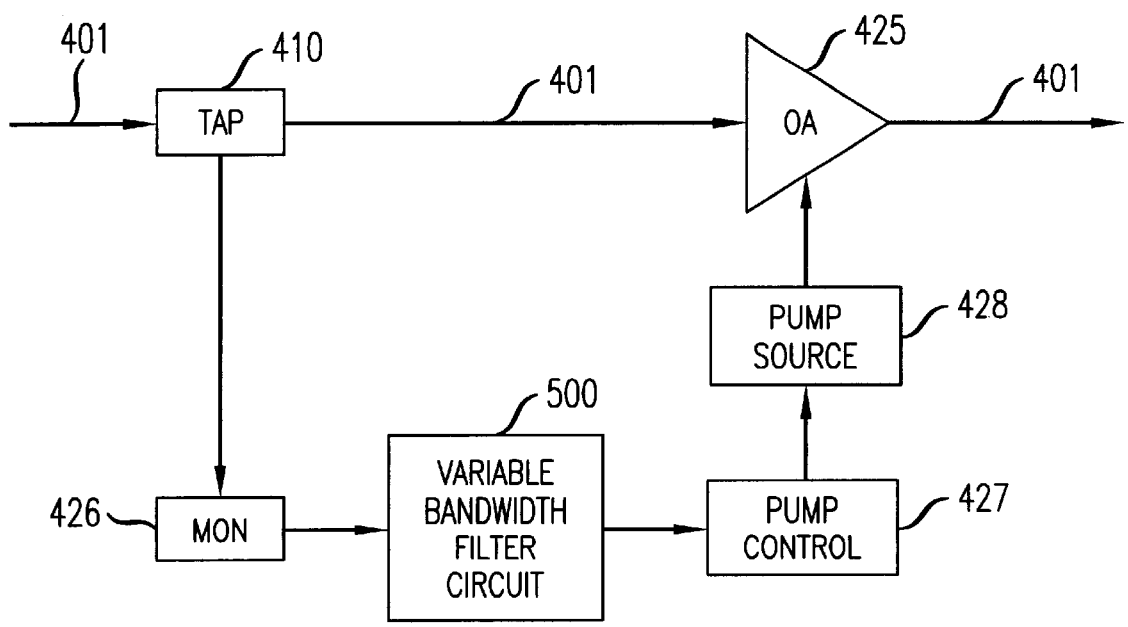
FIG. 4 is a simplified functional block diagram of an exemplary in-line optical amplification arrangement incorporating one illustrative embodiment of the invention.

FIG. 4 shows a simplified block diagram of one embodiment of the invention implemented in conjunction with a gain control arrangement such as that disclosed in U.S. patent application Ser. No. 09/382853, referenced hereinabove. Briefly, an incoming optical signal 401 is tapped at optical tap 410 in a well-known manner so that a first portion of the optical signal is routed to optical amplifier 425 and a second portion of the optical signal is routed to a signal monitor 426. For example, tap 410 may comprise a so-called "98/2" tap wherein 98% of the optical signal power is supplied to optical amplifier 425 while 2% is supplied to optical monitor 426. Signal monitor 426 employs conventional circuitry and techniques for measuring changes in signal power, i.e., input power to the optical amplifier, which is then used to control the amount of pump power for effecting gain control via pump control 427 and pump source 428. By way of example, signal monitor 426 may include a photodetector or any other well-known, suitable component that converts optical signal energy to a corresponding electrical signal. In the embodiment shown in FIG. 4, signal monitor 426 receives the tapped optical signal from optical tap 410 and supplies an electrical signal to variable bandwidth filter circuit 500. The electrical signal output from signal monitor 426 is therefore used to facilitate the detection and measurement of signal power in the corresponding WDM optical signal that is being supplied as input to optical amplifier 425. According to the principles of the invention, variable bandwidth filter circuit 500 can be disposed between signal monitor 426 and pump control 427 to handle any remnants that may exist in the incoming optical signal.

Figure 5A:
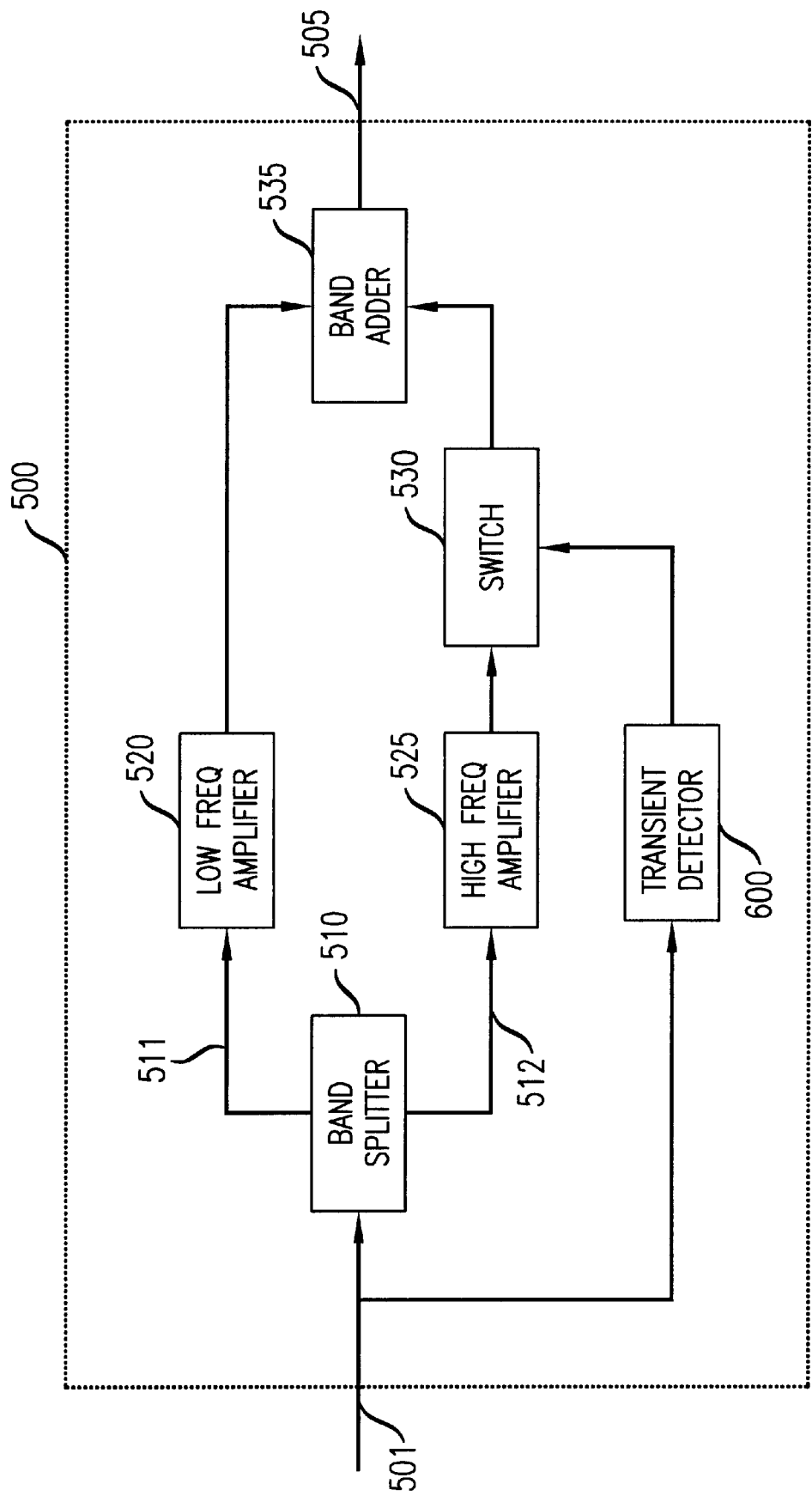
FIGS. 5A and 5B are simplified functional block diagrams of exemplary embodiments of the invention.

FIG. 5A shows one illustrative embodiment of variable bandwidth filter circuit 500 according to the principles of the invention. As shown, variable bandwidth filter circuit 500 includes band splitter 510 for splitting input signal 501 into its low frequency components for transmission in low pass section 511 and its high frequency components for transmission in high pass section 512. In the present embodiment, input signal 501 is an electrical signal that is supplied by signal monitor 426 (FIG. 4). Input signal 501 provides information about the measured signal power corresponding to the optical signal that is tapped at a position upstream from optical amplifier 425 (FIG. 4). Low pass section 511 includes low frequency amplifier 520 while high pass section 512 includes high frequency amplifier 525 and switch 530. As will be described in more detail, high pass section 512 is "switched in" only for transient processing in response to the detection of power transients via transient detector 600. Band adder 535 combines the signal components from low pass section 511 and high pass section 512 to form output signal 505. It will be apparent to those skilled in the art that band splitter 510, band adder 535, switch 530, and low and high frequency amplifiers 520 and 525, respectively, can be implemented using conventional, well-known circuit components, the operation of which is also well-known.

Band splitter 510 operates in a conventional and well-known manner to split input signal 501 into its fast and slow signal components. By way of example, band splitter 510 can be any well-known filtering arrangement that serves as a low pass filter for directing the slow signal components, e.g., low frequency components, via low pass section 511 and as a high pass filter for directing the fast signal components, e.g., high frequency components, via high pass section 512. The slow signal components in low pass section 511 are amplified by low frequency amplifier 520 while the fast signal components in high pass section 512 are amplified by high frequency amplifier 525. Switch 530, which can be an analog switch, is capable of blocking the output of high frequency amplifier 525 depending on the output of transient detector 600. In general, switch 530 either operates in the open or closed position, wherein the closed position completes a circuit path to pass the fast (high frequency) signal components to band adder 535. In the open position, switch 530 prevents the fast (high frequency) signal components from reaching band adder 535.

More specifically, switch 530 is operated in the closed position when transient detector 600 detects a power transient outside of acceptable thresholds, e.g., a large power transient caused by an actual transient event such as when optical channels are added/dropped in the WDM signal. In this way, both the high and low frequency components from high and low pass sections 512 and 511 respectively are passed to band adder 535, which combines them to produce output signal 505. Switch 530 is operated in the open position when transient detector 600 does not detect a power transient outside of acceptable thresholds, thereby blocking the high frequency signal components of input signal 501. Consequently, the high frequency signal components are filtered from input signal 501 such that band adder 535 only receives the low frequency signal components from low pass section 511 to produce output signal 505. Output signal 505 in this instance would therefore be considered a filtered version of input signal 501. Advantageously, direct current (DC) offsets are minimized when switch 530 is opened or closed since DC is blocked for high frequency amplifier 525. Output signal 505 from band adder 535 can then be provided to subsequent gain control circuitry (e.g., pump control 427 in FIG. 4) to effect appropriate control of the optical amplifier.

As will be described in more detail below with regard to FIG. 6A, transient detector 600 is used to distinguish between power transients caused by actual transient events and low level signal variations, such as the remnants associated with the power transients, so that appropriate filtering can be performed by variable bandwidth filter circuit 500. In general the filtering aspect of variable bandwidth filter circuit 500 provides bandwidth control for "capturing" power transients caused by actual transient events and for "ignoring" remnants of power transients or other unwanted signal variations with small signal amplitude so that subsequent optical amplifier control mechanisms can be controlled appropriately. Bandwidth control is achieved by operating variable bandwidth filter circuit 500 with higher bandwidth in a first mode (e.g., when a transient event is detected) and with lower bandwidth in a second mode (e.g., when a transient event is not detected).

In particular, by passing both high and low frequency components of input signal 501 when a transient event is detected by transient detector 600, the bandwidth is effectively "opened" to capture both the high and low frequency signal components of the power transient. Sufficient bandwidth is important in this case because the shape and characteristics of the power transient need to be preserved in the signal so that subsequent control decisions, e.g., optical amplifier gain control, can be accurately performed. In contrast, by passing only the slowly varying low frequency components of input signal 501 when a power transient is not detected by transient detector 600, the bandwidth is effectively "closed" or reduced so that only slow variations in input signal 501 will be passed along. By blocking the high frequency components of input signal 501 in this latter case, any remnants of a previously occurring power transient or other low level signal variations, e.g., noise signals, will be substantially damped enough in magnitude so that they do not disturb the network, e.g., trigger an undesirable gain control response. For example, depending on system design parameters, it may be desirable to "knock down" the remnants from approximately 10% to approximately 1%. In both cases, keeping low frequency gain substantially the same, whether the high frequency components are being passed or blocked, ensures that offsets are kept to a minimum when switching back and forth between the various outputs.

Figure 7:
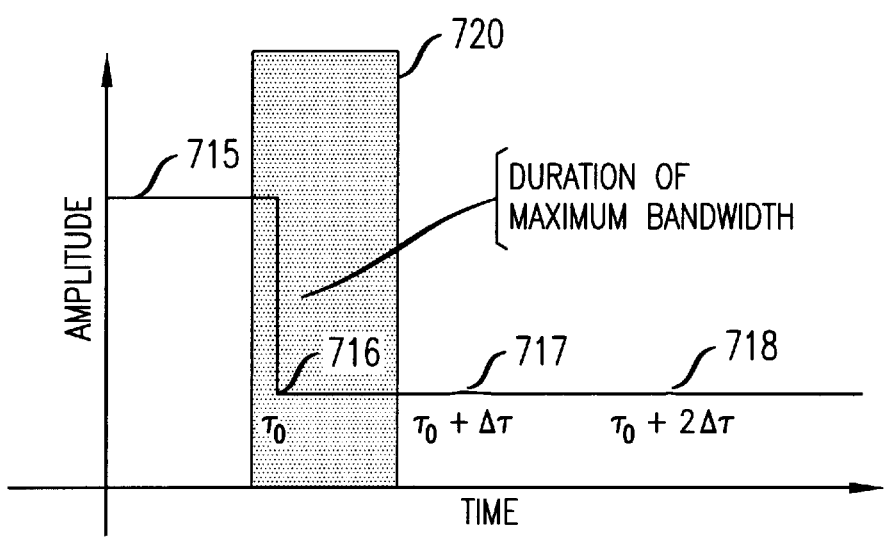
FIG. 7 is a plot of amplitude versus time for an optical signal processed according to the principles of the invention.

FIG. 7 further illustrates these bandwidth control aspects according to the principles of the invention. A period of high bandwidth, shown as shaded portion 720, occurs around time $\tau_0$ to capture the full magnitude of power transient 716 (e.g., both the high and low frequency signal components). However, the period of high bandwidth is limited so that the remnants 717 and 718 that occur at subsequent intervals of Δτ are not captured as transient events. Consequently, pump control 427 (FIG. 4) or other transient control circuitry would respond to power transients 716 from the actual transient event while not being significantly affected by remnants 717, 718 of the power transient. The filtering of remnants is an important advantage of the invention because remnants that would otherwise travel around the ring network could be amplified by subsequent nodes and eventually could trigger undesirable responses in gain control circuitry, protection switching circuitry, and so on.

Although not shown in FIG. 5A, appropriate delays may be incorporated in low frequency amplifier 520 or otherwise within low pass section 511 to facilitate parallel processing of the high and low frequency signal components of input signal 501. For example, the delay through low frequency amplifier 510 could be adjusted to be substantially the same as the summed delay through high frequency amplifier 520 and switch 530.

Figure 5B:
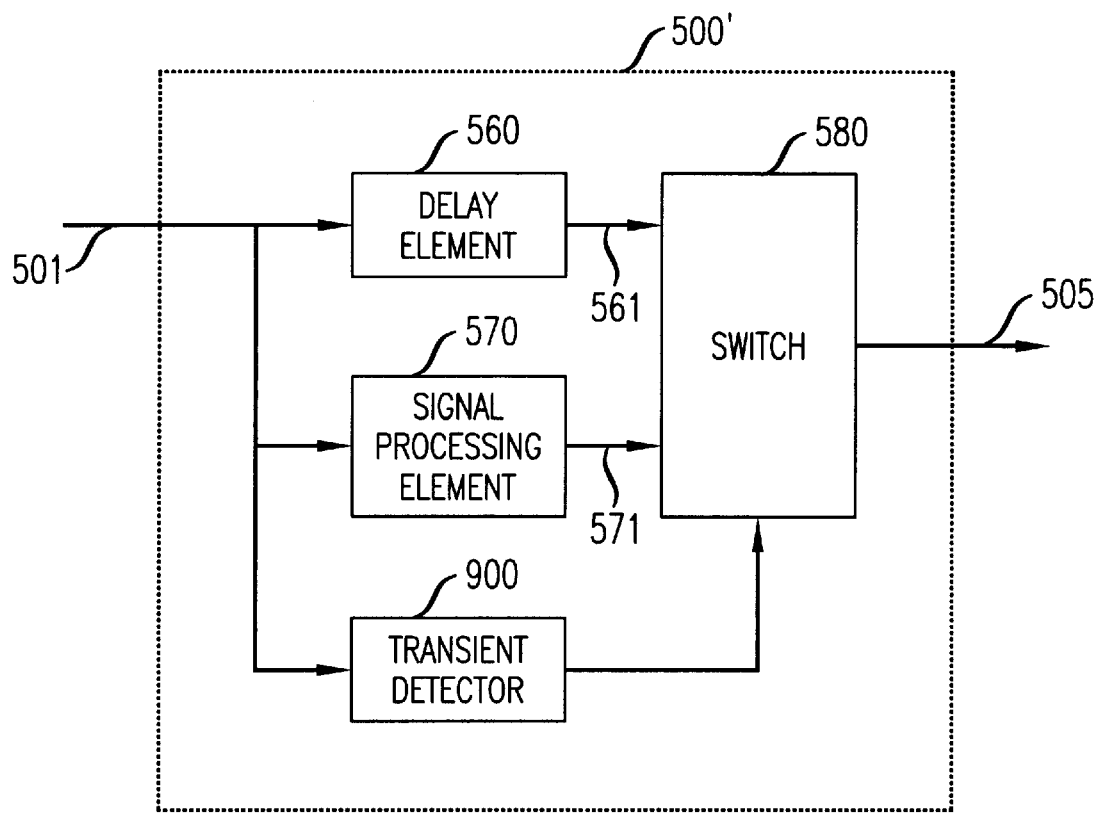

FIG. 5B shows another illustrative embodiment of a variable bandwidth filter circuit according to the principles of the invention, shown here as 500'. As shown, variable bandwidth filter circuit 500' includes delay element 560, signal processing element 570, transient detector 900, and analog switch 580. In one embodiment, delay element 560 is an analog delay element and signal processing element 570 is a low-pass filter, both of which can be implemented using conventional circuitry well-known to those skilled in the art. It should be noted that the embodiments shown and described herein are meant to be illustrative and not limiting in any manner. Accordingly, other suitable and well-known devices and techniques will be apparent to those skilled in the art and may be substituted consistent with the teachings of the invention.

Input signal 501 is provided as input to delay element 560, signal processing element 570 (hereinafter low pass filter 570 in the present embodiment), and transient detector 900. The detailed operation of transient detector 900 will be described below with reference to FIG. 6B. In general, the function of transient detector 900 is similar to that described for transient detector 600 (FIG. 5A), i.e., to distinguish power transients caused by actual transient events from remnants or other unwanted signal variations. In the embodiment shown in FIG. 5B, transient detector 900 determines when a power transient is caused by an actual transient event and causes an appropriate action by switch 580. As shown, analog switch 580 receives a delayed version of input signal 501, shown here as signal 561, as well as a processed or filtered version of input signal 501, shown here as signal 571. The delayed version 561 of input signal 501 includes both the high and low frequency components since no filtering occurs in this path. By contrast, filtered version 571 of input signal 501 includes only low frequency components because of filtering by low pass filter 570.

Based on the output of transient detector 900, analog switch 580 selects either the delayed version 561 of input signal 501 or the filtered version 571 of input signal 501 depending on whether transient detector 900 detects an actual transient event. As in the preceding embodiment, when a power transient is detected, analog switch 580 selects the higher bandwidth, delayed version 561 of input signal 501 so that the full magnitude and characteristics of the power transient can be captured. By contrast, when a power transient is not detected, analog switch 580 selects the lower bandwidth, filtered version 571 of input signal 501. The signal selected by analog switch 580 is then provided as output signal 505 which is subsequently processed by the gain control circuitry (e.g., pump control 427 in FIG. 4) to effect appropriate control of the optical amplifier.

In the preceding embodiments, either analog switch 530 or 580 can be configured to include an additional control input (not shown) for receiving a separate control signal. By way of example only, the control input may be used to provide for software control of the system in one exemplary embodiment. Such software control may be useful for operating analog switch 530 or 580 in a particular state during startup procedures, during testing, and so on. In the preceding embodiments, an optical delay element (not shown) may also be incorporated between optical tap 410 and optical amplifier 425 (FIG. 4) to provide an additional predetermined amount of delay to compensate for processing delays in variable bandwidth filter circuits 500 and 500', e.g., delays associated with transient detectors 600 and 900 (FIGS. 5A and 5B).

Figure 6A:
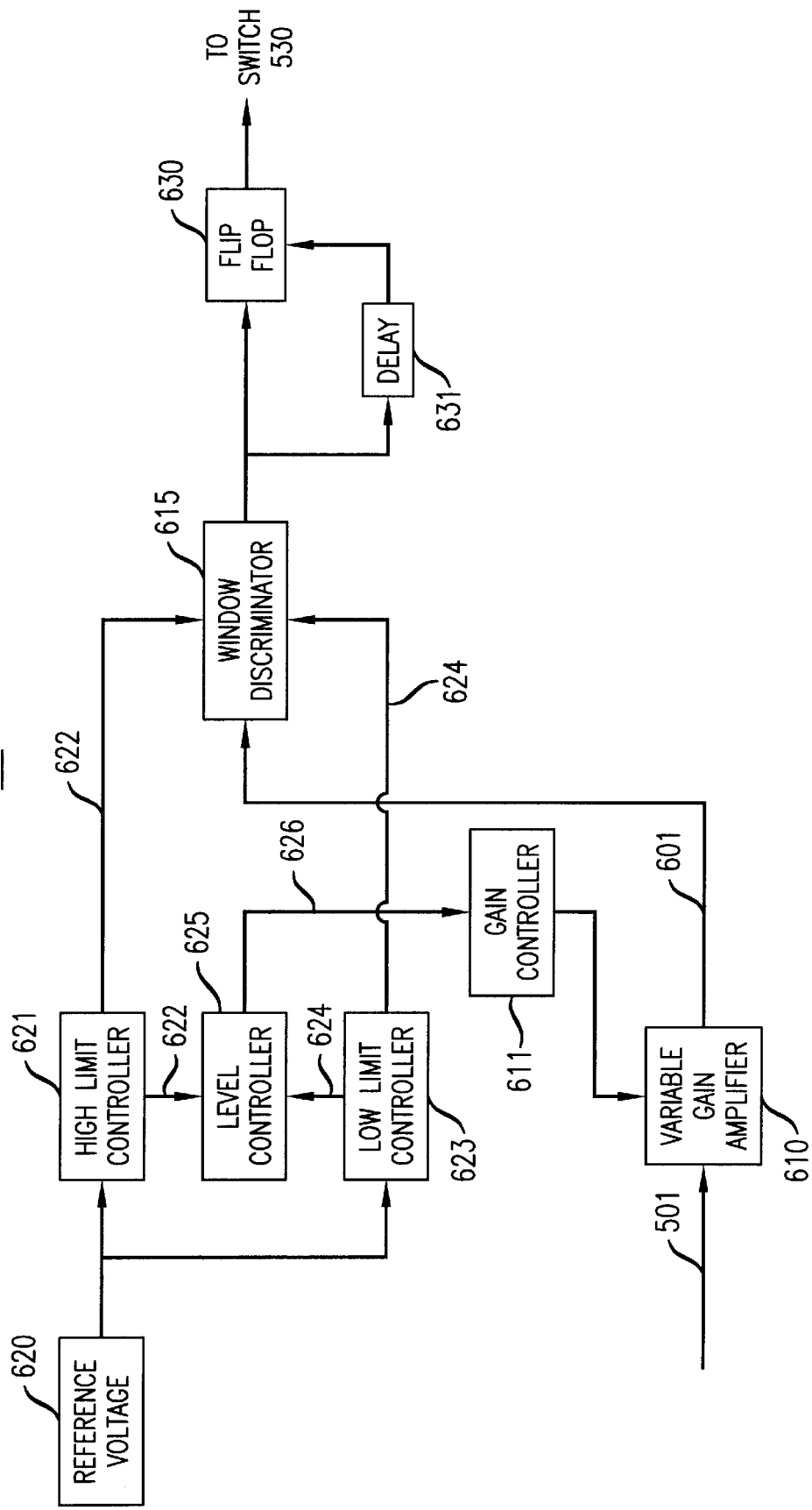
FIGS. 6A and 6B are simplified functional block diagrams of exemplary embodiments of the transient detector shown in FIGS. 5A and 5B, respectively, according to the principles of the invention.

FIG. 6A shows an exemplary embodiment of transient detector 600 according to the principles of the invention. Briefly, transient detector 600 includes a variable gain amplifier 610 for receiving input signal 501, a gain controller 611 coupled to variable gain amplifier 610, and a window discriminator 615 which receives, as one input, the amplified output signal 601 supplied by variable gain amplifier 610. Transient detector 600 further includes a signal threshold generator comprising reference voltage source 620, high limit controller 621, low limit controller 623, and level controller 625 for establishing upper and lower limits to facilitate the detection of transients in input signal 501.

Flip-flop element 630 and delay element 631 operate in conjunction with window discriminator 615 to effect the appropriate control over the selection of signals by switch 530 (see FIG. 5A). The basic principles of operation of variable gain amplifiers, gain controllers (e.g., operational amplifier-based circuits), window discriminators, voltage limit controllers, and flip-flops are well-known to those skilled in the art and will not be described in detail here for sake of brevity. Instead, the use of these well-known circuit components will be described in terms of their functions that are relevant to practicing the invention. It should also be noted that this embodiment is meant to be illustrative only and not limiting. As such, various modifications and substitutions will be apparent to those skilled in the art and are contemplated by the teachings herein.

In the embodiment shown in FIG. 6A, high limit controller 621 and low limit controller 623 serve as voltage sources that are derived from reference voltage source 620. In particular, the output of reference voltage source 620 is provided as input to both high limit controller 621 and low limit controller 623. Responsive to reference voltage source, 620, high limit controller 621 outputs a voltage level that represents an upper limit or upper threshold 622 for input signal 501, while low limit controller 623 outputs a voltage level that represents a lower limit or lower threshold 624 for input signal 501. It should be noted that the prescribed values for upper and lower thresholds 622 and 624 respectively are a matter of design choice. For example, one factor affecting the selection of appropriate values could be the number of optical channels in the WDM system since adding/dropping channels in a system carrying a fewer number of channels could have a greater impact than in a system with a greater number of channels, e.g., adding/dropping 1 channel from a 4-channel system versus adding/dropping 1 channel from an 80-channel system. In principle, selection of appropriate upper and lower thresholds 622 and 624 will ensure that acceptable thresholds are in place to detect transient events of varying magnitude.

As will be described in more detail below, both upper and lower thresholds 622 and 624, respectively, are provided as inputs to window discriminator 615. Upper and lower thresholds 622 and 624, respectively, are also provided as inputs to level controller 625, which supplies an output signal 626 that is voltage constrained between the outputs of high and low limit controllers 621 and 623, respectively. Output signal 626 is coupled to gain controller 611, which is used to control the gain of variable gain amplifier 610.

When input signal 501 is not changing, variable gain amplifier 610 is responsive to gain controller 611 and operates at a gain such that its output signal 601 equals output signal 626, which is voltage constrained between upper and lower thresholds 622 and 624, respectively. In one exemplary embodiment, gain controller 611 may comprise an operational amplifier coupled by an appropriate resistive element or elements between level controller 625 and variable gain amplifier 610. Other gain control implementations will be apparent to those skilled in the art.

As shown in FIG. 6A, window discriminator 615 receives three inputs, those being upper threshold voltage level 622, lower threshold voltage level 624, and variable gain amplifier output signal 601. According to well-known principles of operation, window discriminator 615 determines whether output signal 601 remains within upper and lower threshold voltage levels 622 and 624 and produces a resultant logic output to flip-flop element 630. When input signal 501 is not changing, window discriminator 615 would indicate that output signal 601 is within the upper and lower thresholds 622 and 624 (e.g., no transient event) because output signal 601 in this case would equal output signal 626 from level controller 625. When input signal 501 is changing, the operation of transient detector 600 will be better understood in view of the following two examples.

EXAMPLE 1

When there is a sudden large change in input signal 501, output signal 601 of variable gain amplifier 610 changes to follow input signal 501 given the typical operating characteristics of a variable gain amplifier. As such, output signal 601 will now be outside the limits established by upper and lower thresholds 622 and 624, i.e., either exceeding upper threshold 622 or falling below lower threshold 624, as determined by window discriminator 615 according to well-known principles of operation. When output signal 601 is outside the limits set by upper and lower thresholds 622 and 624, i.e., indicating a transient event, the logic output of window discriminator 615 will then drive operation of flip-flop element 630 which in turn drives operation of switch 530. As previously described, switch 530 will operate to allow both the high and low frequency components of input signal 501 to be passed to band adder 535 (FIG. 5A). In this way, the bandwidth is effectively "opened" so that the full magnitude, shape, etc. of the power transient in input signal 501 can be captured for subsequent gain control processing.

As shown, the output from window discriminator 615 is also provided to delay element 631 which is further coupled to flip-flop element 630. Flip-flop element 630 is therefore automatically reset following the delay provided by delay element 631. Resetting flip-flop element 630 after the delay will in turn cause switch 530 to change states, effectively "closing" the bandwidth and blocking the high frequency components as previously described for FIG. 5A. The amount of delay provided by delay element 631 is a matter of design choice, e.g., ideally less than one round trip around a WDM ring network.

Gain controller 611 adjusts the gain of variable gain amplifier 610 with a time constant $\tau$. After several time-constants, output signal 601 will again equal output signal 626 (supplied by level controller 625), which will be noted by window discriminator 615. It should be noted that this time constant is much shorter than the amount of delay associated with delay element 631.

EXAMPLE 2

In this example, assume the change in input signal 501 is somewhat smaller so that output signal 601 from variable gain amplifier 610 does not exceed or fall below the upper or lower thresholds 622 and 624, respectively. In this case, the logic output of window discriminator 615 will not trigger flip-flop element 630. All other circuits will operate as described in the preceding example.

Figure 6B:
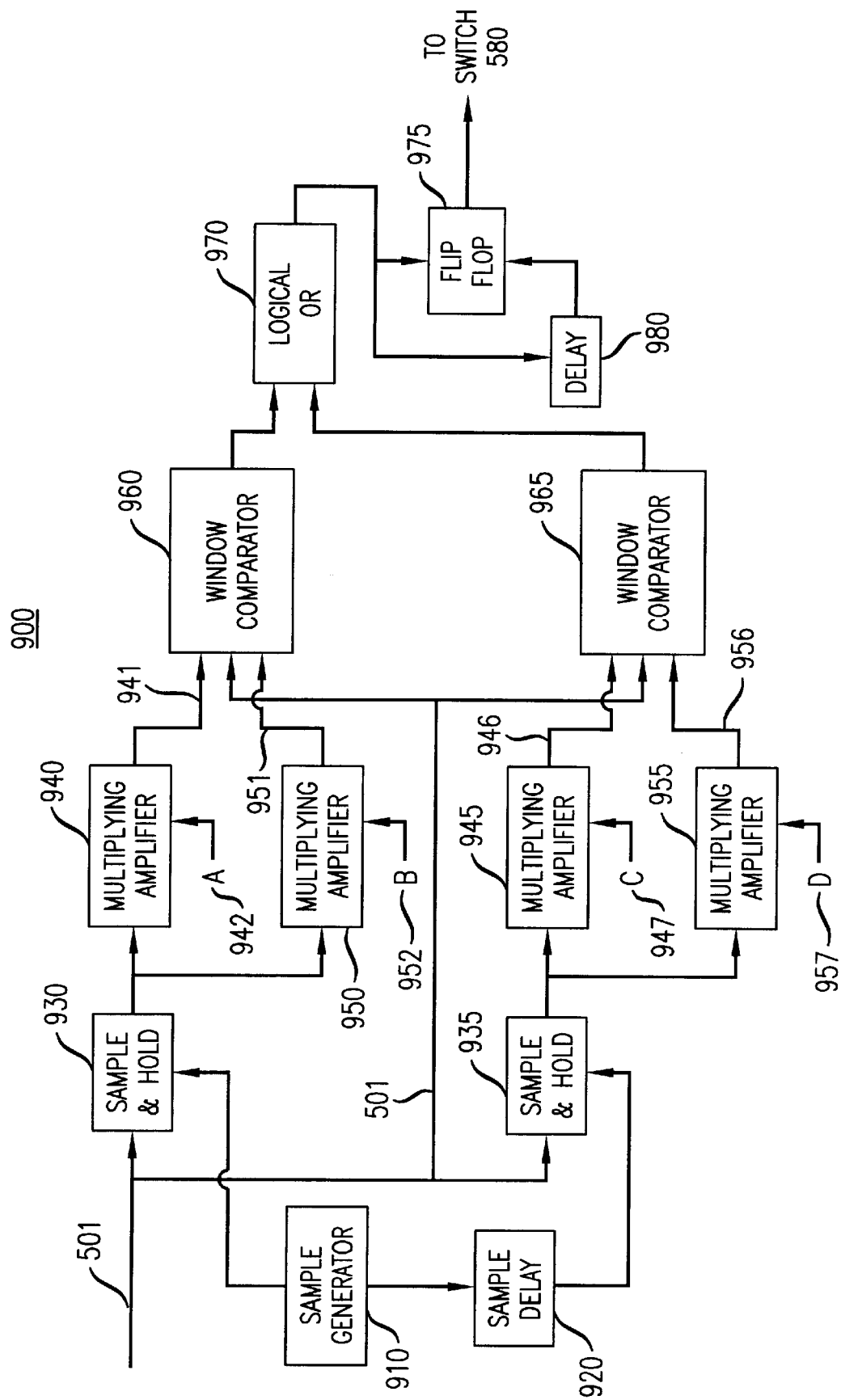

FIG. 6B shows another illustrative embodiment of a transient detector according to the principles of the invention, shown here as transient detector 900. Briefly, transient detector 900 includes two parallel circuit paths, each path including one of sample and hold circuits 930 and 935, two of multiplying amplifiers 940, 945, 950, and 955, and one of window comparators 960 and 965. As will be described in more detail below, the two parallel circuit paths support the same processing functions except that processing in one of the circuit paths is delayed as compared to the other circuit path. Sample generator 910 and sample delay element 920 supply pulses and delayed pulses to the appropriate sample and hold circuits 930 and 935 according to well-known principles of operation. Transient detector 900 further includes a logical OR element 970 for receiving logic inputs from window comparators 960 and 965, flip-flop logic element 975 for receiving the output from logical OR element 970, and delay element 980, the operation of which will be described in more detail below. The circuitry and operation of sample and hold circuits, multiplying amplifiers, window comparators, logical OR elements, and flip-flops are well-known to those skilled in the art and will not be described in detail here for sake of brevity. It should also be noted that this embodiment is meant to be illustrative only and not limiting in any way.

In operation, sample generator 910 generates a continuous series of pulses to sample and hold circuit 930. When one of those pulses arrives at sample and hold circuit 930, the current value of input signal 501 is held constant until the next sample pulse and delivered to each of multiplying amplifiers 940 and 950. Multiplying amplifier 940 multiplies the current value of input signal 501 by a predetermined multiplier value (A) 942 to produce an upper threshold value 941. This upper threshold value 941 represents an upper threshold for changes in input signal 501. In one embodiment, multiplier value (A) 942 has a value greater than 1. Similarly, multiplying amplifier 950 multiplies the current value of input signal 501 by a predetermined multiplier value (B) 952 to produce a lower threshold value 951. As such, this lower threshold value 951 represents a lower threshold for changes in input signal 501. In one embodiment, multiplier value (B) 952 has a value less than 1.

As with the embodiment shown and described in FIG. 6A, it should be noted that the predetermined values for multiplier values (A and B) 942 and 952 are a matter of design choice and will depend on the aforementioned factors, e.g., number of optical channels in the WDM system, and so on.

Continuing with the embodiment shown in FIG. 6B, window comparator 960 receives three inputs, those being input signal 501, upper threshold value 941, and lower threshold value 951. While input signal 501 may be constantly changing, the upper and lower threshold values 941 and 951 only change when a new sample pulse arrives at sample and hold circuit 930. When the value of input signal 501 moves outside the limits established by upper and lower threshold values 941 and 951, the output of window comparator 960 conveys that information as a logic input to logical OR element 970. Thus, when input signal 501 changes to a value that is outside the limits set by upper and lower threshold values 941 and 951, i.e., indicating a transient event, the output of logical OR element 970 activates flip-flop element 975. The output of flip-flop element 975 activates analog switch 580 (FIG. 5B), thereby opening the bandwidth for a period covering the duration of the initial transient, but less than the time for the remnants to travel around the ring, e.g., $\Delta\tau$ (see FIGS. 3 and 7).

As shown, flip-flop element 975 receives inputs from logical OR element 970 and delay element 980 and provides an output to analog switch 580 (FIG. 5B). Flip-flop element 975 is automatically reset following a delay determined by delay element 980. Again, the amount of delay provided by delay element 980 is a matter of design choice, e.g., ideally less than one round trip around a WDM ring network.

According to another aspect of the invention, the parallel circuit path including sample and hold circuit 935, multiplying amplifiers 945 and 955, and window comparator 965 are used to ensure that a transient event is not missed. For example, a transient event might be missed if input signal 501 changes (i.e., transient event) at the precise time when the sample pulse selects new upper and lower threshold values 941 and 951. In operation, sample and hold circuit 935, multiplying amplifiers 945 and 955, multiplier values (C and D) 947 and 957, upper and lower threshold values 946 and 956, and window comparator 965 perform functions similar to those described above and will not be repeated here for sake of brevity. Because the sample pulse for this parallel circuit path is delayed by sample delay 920, the limits set by upper and lower threshold values 946 and 956 for window comparator 965 change at a different time than the limits set by upper and lower threshold values 941 and 951 for window comparator 960. Consequently, by adding the second parallel circuit path and logically "OR" ing the outputs of each path, all transient events will therefore be detected regardless of timing since the upper and lower threshold values 941 and 951 will not be changing at the same time as upper and lower threshold values 946 and 956.

FIG. 7 shows the characteristics of a signal after being processed by either variable bandwidth filter circuit 500 (FIG. 5A) or 500' (FIG. 5B) according to the principles of the invention (compare to the unprocessed signal in FIG. 3). As shown in FIG. 7, the power transient at time $\tau_0$ is shown to occur when a signal drops from a first power level 715 to, a second power level 716 in response to a particular event or condition. This power transient therefore corresponds to the initial transient event. Because the duration of maximum bandwidth (shaded portion 720), only occurs around time $\tau_0$ when the transient event occurs, remnants 717 and 718 are therefore substantially filtered out according to the principles of the invention.

As previously described, the filtering performed according to the principles of the invention ensures that the bandwidth is "opened" at time $\tau_0$ to capture the full magnitude, shape, etc. of the power transient, but "closed" after time $\tau_0$ so that remnants 717 and 718 are filtered out, "knocked down", or substantially suppressed enough in magnitude so that they do not disturb transmission in the ring network. In fact, remnants 717 and 718 become progressively weaker as they travel around the ring since they are no longer strong enough to trigger a transient event at subsequent nodes which would otherwise lead to undesirable amplification of the remnants. Accordingly, pump control 427 (FIG. 4) receives a signal having characteristics as shown in FIG. 7, i.e., preservation of power transient and "knocked down" remnants. Appropriate gain control can then be effected for optical amplifier 425 in response to the power transient while unwanted or undesirable responses to remnants or other noise in the signal are substantially reduced.

Other variations or modifications to the embodiments shown and described herein will be apparent to those skilled in the art consistent with the teachings of the invention. For example, control of the bandwidth (i.e., opening and closing) performed by analog switch 580 and low pass filter 570 (FIG. 5B) could be performed by a sample and hold circuit (not shown). For example, the sample and hold circuit would track during the shaded interval 720 (see FIG. 7) and be in a hold pattern at the end of the interval. In this manner, input signal 501 would be updated whenever a transient occurs. Periodic updates could also follow at times that greatly exceed $\Delta\tau$, i.e., the time for a remnant to travel completely around the ring. For this case, transient detector 900 would not require flip-flop element 975 and the associated circuitry. An optical delay element (not shown) placed in the transmission path would also permit the control signal to change at the same time as when the number of channels changes, i.e., the transient event.

Companding amplifiers could also be used where nonlinear detection of transients is desired. In such cases, the system could, for example, be made more responsive to losses of power rather than to increases in power. A tunable filter (not shown) could also be used according to the principles of the invention. In this case, an important design factor would relate to the response characteristics of the tunable filter for changing bandwidth. For example, the tunable filter should ideally operate such that the bandwidth can be increased, i.e., opened, to a maximum value in less time than it takes for a power transient to drive the output to unacceptable levels.

Furthermore, trade-offs can be made as a matter of design choice as to whether the circuitry responds to percentage changes or absolute changes, both of which result in different amounts of control activity.

The foregoing is merely illustrative of the principles of the invention. Those skilled in the art will be able to devise numerous arrangements, which, although not explicitly shown or described herein, nevertheless embody those principles that are within the spirit and scope of the invention. For example, although the illustrative embodiments were described in the context of optical amplifier control in WDM ring networks, the principles of the invention may be employed with any control system in which there is a desired response to large signals accompanied by a need to limit or suppress undesirable responses to small signal variations.

What is claimed is:

1. An apparatus for controlling response to power transients in an optically amplified wavelength division multiplexed (WDM) ring network, the apparatus comprising:
   a variable bandwidth filter circuit operable in a first mode to pass a power transient occurring in a WDM signal, wherein the power transient is indicative of a change in signal power corresponding to a transient event, and further operable in a second mode to substantially suppress low level signal variations of the power transient in the WDM signal that propagate around the WDM ring network,
wherein the power transient occurs in a first time period and the low level signal variations of the power transient are substantially suppressed at one or more subsequent time intervals after the first time period, and wherein the one or more subsequent time intervals substantially correspond to an approximate round trip time for the low level signal variations to propagate around the WDM ring network.

2. The apparatus according to claim 1, wherein the transient event is an event selected from the group consisting of adding optical channels, dropping optical channels, a network reconfiguration, a failure event, and a recovery from a failure event.

3. The apparatus according to claim 2, wherein the transient event corresponds to adding or dropping one or more of the plurality of optical channels in the WDM optical signal such that a power transient occurs in optical signal power of one or more surviving optical channels.

4. The apparatus according to claim 1, wherein the low level signal variations include one or more remnants of the power transient occurring subsequent to the transient event.

5. The apparatus according to claim 4, wherein the variable bandwidth filter circuit operates at a first prescribed bandwidth during the first time period to pass the power transient when the transient event occurs and further operates at a second prescribed bandwidth that is less than the first prescribed bandwidth during the one or more subsequent time intervals to substantially suppress the one or more remnants of the power transient.

6. The apparatus according to claim 5, wherein the variable bandwidth filter circuit receives an input signal having high frequency signal components and low frequency signal components, and wherein the first prescribed bandwidth is sufficient to pass both the high frequency signal components and low frequency signal components and wherein the second prescribed bandwidth is sufficient to only pass the low frequency signal components.

7. The apparatus according to claim 6, wherein the input signal is an electrical signal indicative of signal power in a corresponding optical signal.

8. The apparatus according to claim 6, wherein the variable bandwidth filter circuit comprises:
a band splitter for separating the input signal into the low frequency signal components and the high frequency signal components;
a low frequency amplifier coupled to the band splitter in a first transmission path for receiving the low frequency signal components;
a high frequency amplifier coupled to the band splitter in a second transmission path for receiving the high frequency signal components; and
a switch coupled to the high frequency amplifier in the second transmission path, the switch capable of blocking the high frequency signal components in response to the detection of the power transient.

9. The apparatus according to claim 8, further comprising:
a transient detector for detecting the power transient in the input signal; and
a band adder for combining signal components from the first and second transmission paths to produce an output signal.

10. The apparatus according to claim 9, wherein the transient detector comprises:

a variable gain amplifier for receiving the input signal and providing an amplified output signal;
a signal threshold generator for producing a first and second threshold value associated with the input signal, wherein the first threshold value is greater than the second threshold value such that the first threshold value represents an upper threshold for the input signal and the second threshold value represents a lower threshold for the input signal; and
a window discriminator coupled to the signal threshold generator and to the variable gain amplifier, the window discriminator being operable to compare the value of the amplified output signal to the first and second threshold values and produce a resultant logic output, wherein the logic output is capable of providing an indication of the presence or absence of a transient event.

11. The apparatus according to claim 10, wherein the signal threshold generator includes:
a reference voltage source;
a high limit controller responsive to the reference voltage source for generating the first threshold value;
a low limit controller responsive to the reference voltage source for generating the second threshold value; and
a level controller responsive to the high limit controller and the low limit controller for generating an output signal that is voltage constrained by the first and second threshold values.

12. The apparatus according to claim 11, wherein the transient detector further comprises:
a gain controller coupled between the level controller and the variable gain amplifier for controlling the gain of the variable gain amplifier as a function of the level controller output signal.

13. The apparatus according to claim 10, wherein the transient detector further comprises a flip-flop logic element and a delay element, the flip-flop logic element being responsive to the resultant logic output of the window discriminator to produce an output control signal to the switch.

14. The apparatus according to 13, wherein the flip-flop logic element is automatically reset following a delay determined by the delay element, wherein an amount of delay provided by the delay element is approximately less than the time associated with one round trip around the WDM ring network.

15. The apparatus according to claim 6, wherein the variable bandwidth filter circuit comprises:
a delay element for receiving the input signal;
a low pass filter for receiving the input signal and supplying a filtered version of the input signal comprising the low frequency signal components;
a transient detector for receiving the input signal and detecting a power transient caused by a transient event; and
a switch coupled to the delay element and to the low pass filter, the switch being operable to select the delayed version of the input signal in response to the detection of the transient event and, in the absence of a transient event, being operable to select the filtered version of the input signal.

16. The apparatus according to claim 15, wherein the transient detector includes a first detection circuit comprising:
a first sample and hold circuit for receiving and processing the input signal;

a first and second multiplying amplifier, each coupled to an output of the first sample and hold circuit, the first multiplying amplifier being operable to produce a first threshold value associated with the input signal, the second multiplying amplifier being operable to produce a second threshold value associated with the input signal, wherein the first threshold value is greater than the second threshold value such that the first threshold value represents an upper threshold for the input signal and the second threshold value represents a lower threshold for the input signal; and a first window comparator coupled to an output from each of the first and second multiplying amplifiers and to the input signal, the window comparator being operable to compare the value of the input signal to the first and second threshold values and produce a resultant logic output, wherein the logic output is capable of providing an indication of the presence or absence of a transient event.

17. The apparatus according to claim 16, wherein the transient detector further comprises a sample generator coupled to the first sample and hold circuit for generating pulses to trigger operation of the first sample and hold circuit.

18. The apparatus according to claim 16, wherein the first multiplying amplifier multiplies the current value of the input signal by a first predetermined multiplier value and wherein the second multiplying amplifier multiplies the current value of the input signal by a second predetermined multiplier value.

19. The apparatus according to claim 18, wherein the first predetermined multiplier value is greater than 1 and the second predetermined multiplier value is less than 1.

20. The apparatus according to claim 16, wherein the transient detector further includes a second detection circuit comprising:

a second sample and hold circuit for receiving and processing the input signal;

a third and fourth multiplying amplifier, each coupled to an output of the second sample and hold circuit, the third multiplying amplifier being operable to produce a third threshold value corresponding to the input signal, the fourth multiplying amplifier being operable to produce a fourth threshold value corresponding to the input signal, wherein the third threshold value is greater than the fourth threshold value such that the third threshold value represents an upper threshold for the input signal and the fourth threshold value represents a lower threshold for the input signal; and a second window comparator coupled to an output from each of the third and fourth multiplying amplifiers and to the input signal, the second window comparator being operable to compare the value of the input signal to the third and fourth threshold values and produce a resultant logic output, wherein the logic output is capable of providing an indication of the presence or absence of a transient event.

21. The apparatus according to claim 20, wherein the transient detector further comprises a sample delay element, coupled between the sample generator and the second sample and hold circuit, for supplying a delayed version of the pulses to trigger operation of the second sample and hold circuit.

22. The apparatus according to claim 21, wherein the first and second detection circuits operate substantially in parallel to detect the occurrence of a transient event.

23. The apparatus according to claim 22, wherein the transient detector further comprises a logical OR element, coupled to each of the first and second window comparators, wherein an output of the logical OR element is capable of providing an indication of the presence or absence of a transient event.

24. The apparatus according to claim 20, wherein the transient detector further includes a flip-flop logic element and a delay element, the flip-flop logic element being responsive to the output of the logical OR element to produce an output control signal to the switch.

25. The apparatus according to claim 24, wherein the flip-flop logic element is automatically reset following a delay determined by the delay element, wherein an amount of delay provided by the delay element is approximately less than the time associated with one round trip around the WDM ring network.

26. An apparatus for controlling response to power transients in an optically amplified wavelength division multiplexed (WDM) ring network, the apparatus comprising:

a variable bandwidth filter circuit operable at a first prescribed bandwidth at time $\tau_0$ to pass a power transient occurring in a WDM signal, wherein the power transient is indicative of a change in signal power corresponding to a transient event, and further operable at a second prescribed bandwidth that is less than the first prescribed bandwidth at time $\tau_0+\Delta\tau$ to substantially suppress one or more subsequent remnants of the power transient in the WDM signal, wherein $\tau_0$ is representative of the occurrence of the transient event and wherein $\Delta\tau$ is representative of approximate round trip time for the one or more remnants of the power transient to propagate around the WDM ring network.

27. An optical amplifier for amplifying a wavelength division multiplexed (WDM) optical signal in a WDM ring network, the optical amplifier including a pump source and a pump control circuit for controlling an amount of pump power as a function of changes in optical signal power in the WDM optical signal, the optical amplifier comprising:

a variable bandwidth filter circuit operable at a first prescribed bandwidth at time $\tau_0$ to detect a change in signal power occurring in the WDM optical signal at a position upstream from the optical amplifier, wherein the change in signal power is indicative of a power transient corresponding to a transient event, the variable bandwidth filter circuit further operable at a second prescribed bandwidth that is less than the first prescribed bandwidth at time $\tau_0+\Delta\tau$ to substantially suppress one or more subsequent remnants of the power transient, wherein $\tau_0$ is representative of the occurrence of the transient event and wherein $\Delta\tau$ is representative of approximate round trip time for the one or more remnants of the power transient to propagate around the WDM ring network.

28. A method of controlling responses to power transients in an optically amplified wavelength division multiplexed (WDM) ring network, the method comprising:

operating a variable bandwidth filter circuit at a first prescribed bandwidth during a first period of time $\tau_0$ to detect a power transient in the WDM signal, wherein the power transient is indicative of a change in signal power corresponding to a transient event; and operating the variable bandwidth filter circuit at a second prescribed bandwidth that is less than the first prescribed bandwidth at time $\tau_0+\Delta\tau$ to substantially suppress one or more subsequent remnants of the power transient in the WDM signal, wherein $\tau_0$ is representative of the occurrence of the transient event and wherein $\Delta\tau$ is representative of approximate round trip time for the one or more remnants of the power transient to propagate around the WDM ring network.

29. A method of controlling responses to power transients in an optically amplified wavelength division multiplexed (WDM) ring network, the method comprising:

detecting a power transient in a WDM signal during a first period of time $\tau_0$, wherein the power transient is indicative of a change in signal power corresponding to a transient event; and filtering one or more subsequent remnants of the power transient in the WDM signal at time $\tau_0+\Delta\tau$, wherein $\tau_0$ is representative of the occurrence of the transient event and wherein $\Delta\tau$ is representative of approximate round trip time for the one or more remnants of the power transient to propagate around the WDM ring network.

* * * * *